United States Patent
McIlree, Sr.

(10) Patent No.: US 7,013,524 B1
(45) Date of Patent: Mar. 21, 2006

(54) GRILL CLEANING CLAW

(76) Inventor: Michael D. McIlree, Sr., 1326 Noblestown Rd., Oakdale, PA (US) 15071

( * ) Notice: Subject to any disclaimer, the term of this patent is extended or adjusted under 35 U.S.C. 154(b) by 0 days.

(21) Appl. No.: 10/937,601

(22) Filed: Sep. 9, 2004

(51) Int. Cl.
*A47L 17/06* (2006.01)

(52) U.S. Cl. ............................. 15/236.08; 15/236.06; 15/236.09; 30/169

(58) Field of Classification Search ............ 15/236.06, 15/236.08, 236.09; 30/169
See application file for complete search history.

(56) References Cited

U.S. PATENT DOCUMENTS

| | | | |
|---|---|---|---|
| 790,228 A * | 5/1905 | Rohrer | ............... 30/121.5 |
| 2,338,647 A * | 1/1944 | Koon | ............... 452/105 |
| D221,244 S * | 7/1971 | Lawrence | ............... D32/46 |
| 4,091,579 A | 5/1978 | Giangiulio | |
| 4,214,342 A | 7/1980 | Amundsen | |
| 4,668,302 A | 5/1987 | Kolodziej | |
| 4,910,827 A * | 3/1990 | Tandberg et al. | ........ 15/236.06 |
| 5,934,721 A | 8/1999 | Walde | |
| 6,061,862 A | 5/2000 | Whitaker | |
| 6,167,585 B1 * | 1/2001 | Fridman et al. | ........... 15/245.1 |
| 6,276,023 B1 | 8/2001 | Grundy | |
| 6,311,362 B1 * | 11/2001 | Arbogast | ................ 15/236.08 |
| 2005/0028311 A1 * | 2/2005 | Birnbaum | ............... 15/236.08 |

* cited by examiner

*Primary Examiner*—Randall Chin
(74) *Attorney, Agent, or Firm*—Christine W. Trebilcock, Esq.; Cohen & Grigsby, P.C.

(57) ABSTRACT

A grill cleaning apparatus is provided for scraping to the grooves of grill broiler plates to remove unwanted matter comprising of an elongated body having a handle portion at one end and a scraper portion at the other end, with a claw extending outward from the scraper portion. The claw is shaped to fit into the angled grooves of most grills, having a trunk with at least two side portions that widen outward from the scraper portion and terminates with a plurality of spaced apart teeth. Each tooth has at least one projection for accessing the depth of the grooves to grasp and release any unwanted matter.

20 Claims, 5 Drawing Sheets

GRILL CLEANING CLAW

FIELD OF THE INVENTION

The present invention relates generally to a grill cleaning apparatus and, more particularly, to a tool for scraping to clean grills.

BACKGROUND OF THE INVENTION

Many restaurants, and to some extent individuals, rely on grills that have grooved surfaces on their broiler grates for cooking items such as fish, chicken, steaks, ribs and many other food items thereon. Such grooved surfaces on the broiler grates are often designed with inward by angled grooves to prevent food items from falling into bottom of the grill. The grooves may be at right angles and have a depth of ½ to 1 inch or ¾ inch, which depth may not be consistent across the width of each groove. Depending on the broiler design, each groove may have multiple depths and each portion may be deeper. An example of this broiler grate design is the Vulcan® VCCB series gas char-broiler. While grilling, food particles, grease and the like separate from the food and fall into the grooves. Residual food particles may stick to surfaces in and around the grooves.

To maintain a consistent grilling surface and sanitary cooking conditions the grill must be regularly cleaned. Oils from the food being grilled run down the grooved of the broiler grates to the bottom of the grill. Cleaning of the oils, carbonaceous char, and other matter, is most commonly performed using wire brushes having bristles of uniform length. However the unique topographical features of such grooved grills make them particularly challenging to clean using uniform lengths of bristle. The bristles prove incompatible with the grooved surface of the grill. The depth of the grooves, typically ¾ inch, and particularly the angle further prevent the bristles from reaching into between the grooves for cleaning. Typical bristle brushes can only effectively clean the top of the grill surfaces, but not in between the grooves for sufficient cleaning.

Bristle brushes as well as various other scraping implements do not offer an adequate solution for cleaning the broiler grate in its entirety, including the surfaces and in between the grooves. Consequently, a need exists for an effective cleaning tool for adequately cleaning broiler grates.

SUMMARY OF THE INVENTION

The present invention is directed to a grill cleaning apparatus that overcomes the shortcomings of the prior art and provides benefits to the art of grill cleaning. The invention provides a grill cleaning apparatus comprising an elongated body having a handle portion at one end and a scraper portion at the other end, and a claw extending outward from the scraper portion. The outwardly extending claw is shaped to fit into the angled grooves of most grills. The claw has a trunk with at least two side portions that widen outward from the scraper portion, and terminates with a plurality of spaced apart teeth. Each tooth has several edges and at least one projection for accessing the depth of the grooves.

The unique shape and contour of the present invention enables it to reach between and down into the depths of grill grooves to grasp and release any unwanted food particles, grease, and the like. It also provides the benefit of not becoming too hot for use and having a long enough handle to minimize or prevent injury to the user. Other advantages include its ease of use and inexpensive manufacturing cost.

Having briefly described the present invention, these and other objects, features and advantages of the invention will become apparent by those skilled in the art from the following detailed description of the invention and the accompanying drawings.

EXAMPLES OF EMBODIMENTS OF THE INVENTION

Figure 1:
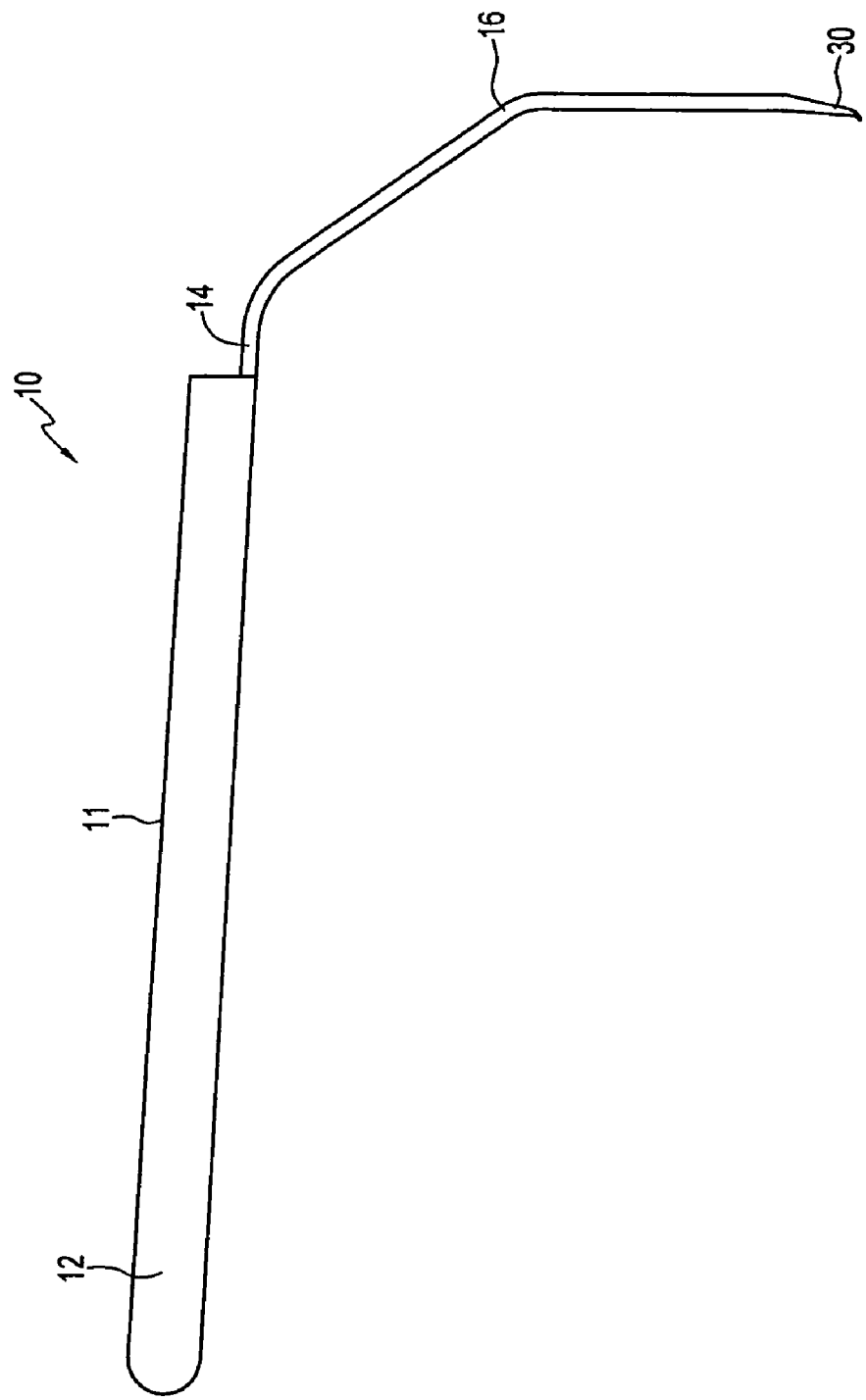
FIG. 1 is a side view showing an embodiment of the present invention.
Figure 3:
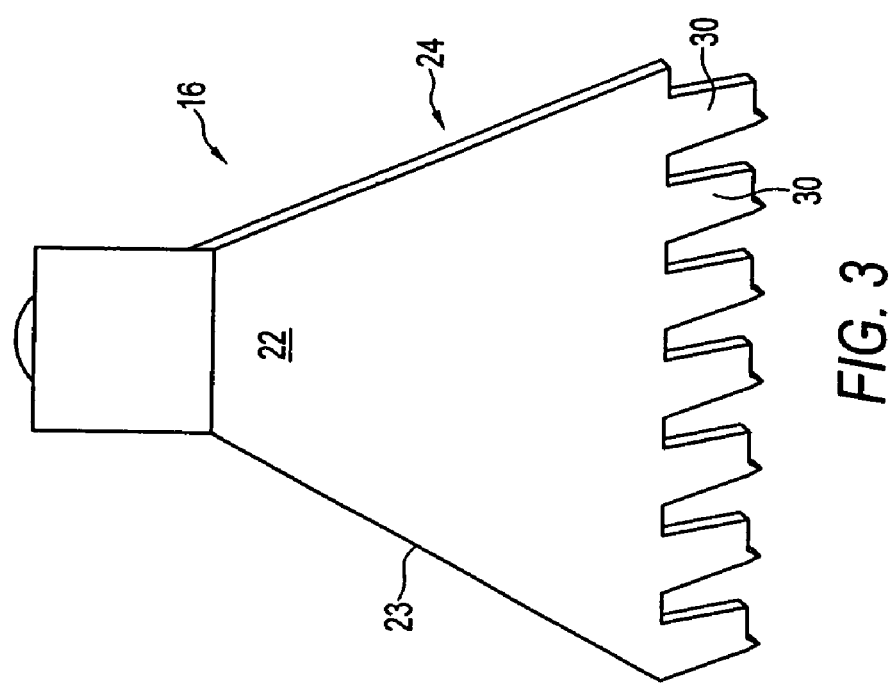
FIG. 3 is a front view of an embodiment of the present invention.
Figure 5:
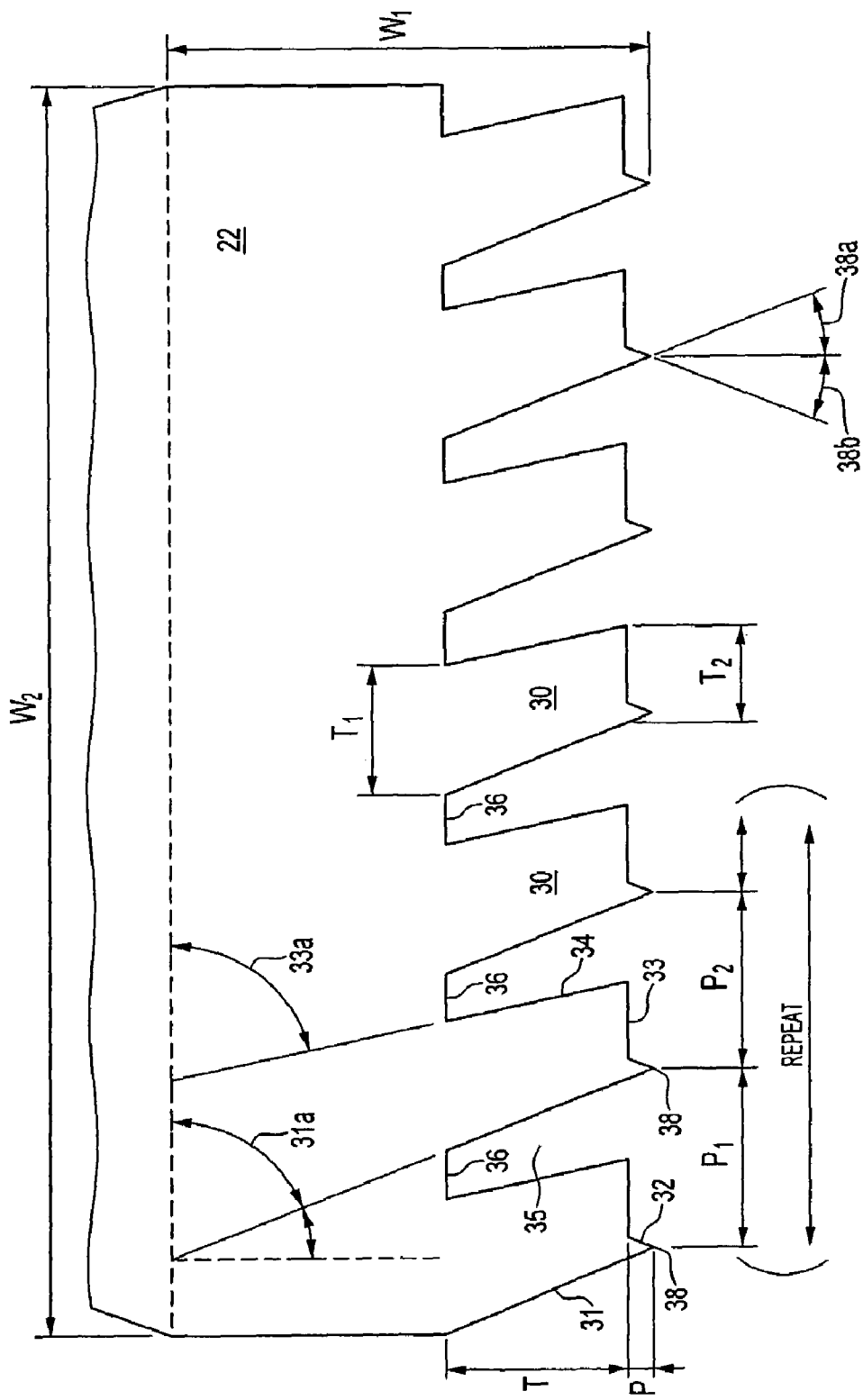
FIG. 5 is a detail tooth profile view of an embodiment of the present invention.

A grill cleaning apparatus 10 comprises a generally elongated body 11 having a handle portion 12 and a scraper portion 14, as shown in FIG. 1. A claw 16 extends outwardly from scraper portion 14 and terminates with a plurality of teeth 30, as depicted in FIGS. 1, 3, and 5.

Handle portion 12 is of any graspable shape and, preferably, has an elongated cylindrical shape, as can be seen in FIG. 1. In an example, the handle of the present invention is made out of a thermo resistant material that does not easily conduct heat to protect and minimize injury to the user. In this way, the grill cleaning claw can be utilized on a hot grill without becoming too hot to hold. Materials such as wood, ceramic, plastic, and various other composite materials have these desired heat resistant properties. In the alternative, in a grill application other than for hot grills, the handle 12 may be constructed of other materials than these. The handle should be such that it can comfortably fit into the palm of the user's hand and provide sufficient thickness to enable the user to push downward while scraping without buckling the handle. Unlike the prior scraper devices, the handle of the present invention has a much longer handle length, as measured from the proximal end to the distal end (the proximal end being that end held by the user and the distal end being the end nearest the teeth). The longer handle length reduces or eliminates the likelihood of grease or other materials splashing up on the user's hand while the scraper is being used to scrape the grill surface.

Figure 2:
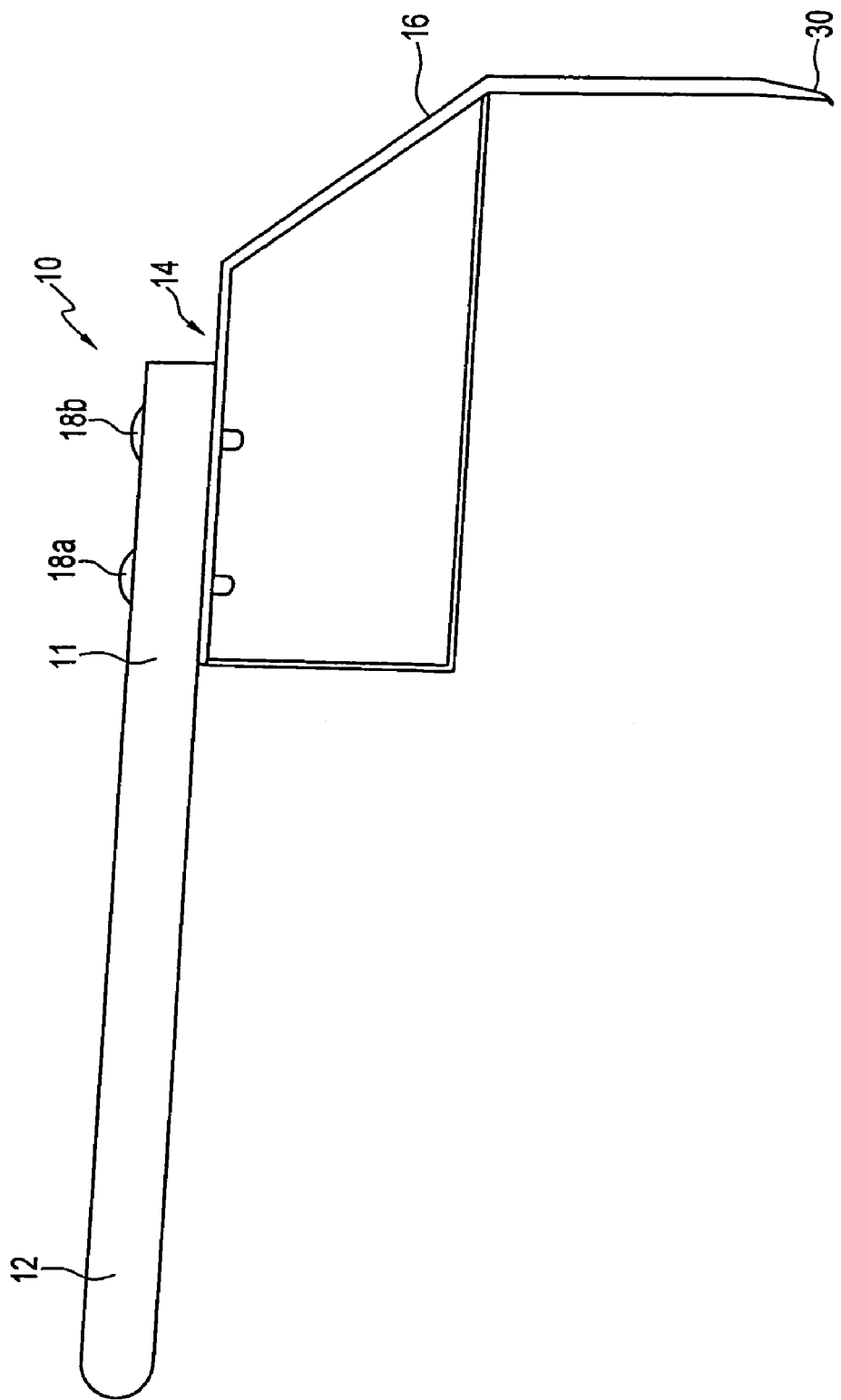
FIG. 2 is a side view showing another embodiment of the present invention.

Claw 16 is associated with scraper portion 14 opposite handle portion 12, as shown in FIG. 2. The claw 16 may be internally integrated or detachably integrated to the scraper portion 14 opposite handle portion 12. In an embodiment, an example of which is illustrated in FIG. 2, claw 16 comprises a rigid molded body removably or fixedly attached to elongated body 11 by connecting mechanism 18 (not shown) connected to scraper portion 14. Connecting mechanism 18 (not shown) consists of securing means such as bolts, nails, screws, snaps, clamps, straps, adhesive, or the like; 18a and 18b, as depicted in FIG. 2, to provide the desired hold—fixed, semi-rigid, or flexible. For example, five bolts can be used to affix the claw 16 to the scraper portion using holes therein sized to accept the bolts. The holes may be made 17/64 inch in diameter in this example.

The claw 16 of the present invention can be made out of a variety of any suitable materials, such as stainless steel, woods, plastics, or other materials that provide the benefits described herein. The claw should be sufficiently strong to avoid buckling while scraping and adaptable to having a relatively sharp edge. It is also preferable to use a material suitable for being cleaned or sterilized as necessary. The claw 16 is comprised of multiple teeth 30, as can be seen in FIGS. 3 and 5. The teeth are designed to be of a sufficient depth and angle to reach the sides and into the depths of the deepest grooves of the grill. These vary to accommodate the groove depth and angle of a particular grill. Depending upon the particular grill application, it may be desirous for the teeth 30 to have a projection 38 to fit fairly snug in the groove of a grill to scrape out smaller particles, liquids or grease, as can be seen in FIG. 5. In an example of a particular embodiment, each of the teeth has at least one projection, which may be a V-shaped, pointed extension 38 at the end of the tooth, shown in FIG. 5, where the projection or extension extends into the groove in order to clean out the small grease trough in each of the grooves of the grill. In an example, the projection 38 is measured as P, as shown in FIG. 5, and is within the range of about 1/16 inch to about 2 inches, and preferably about 1/8 inch.

Figure 4:
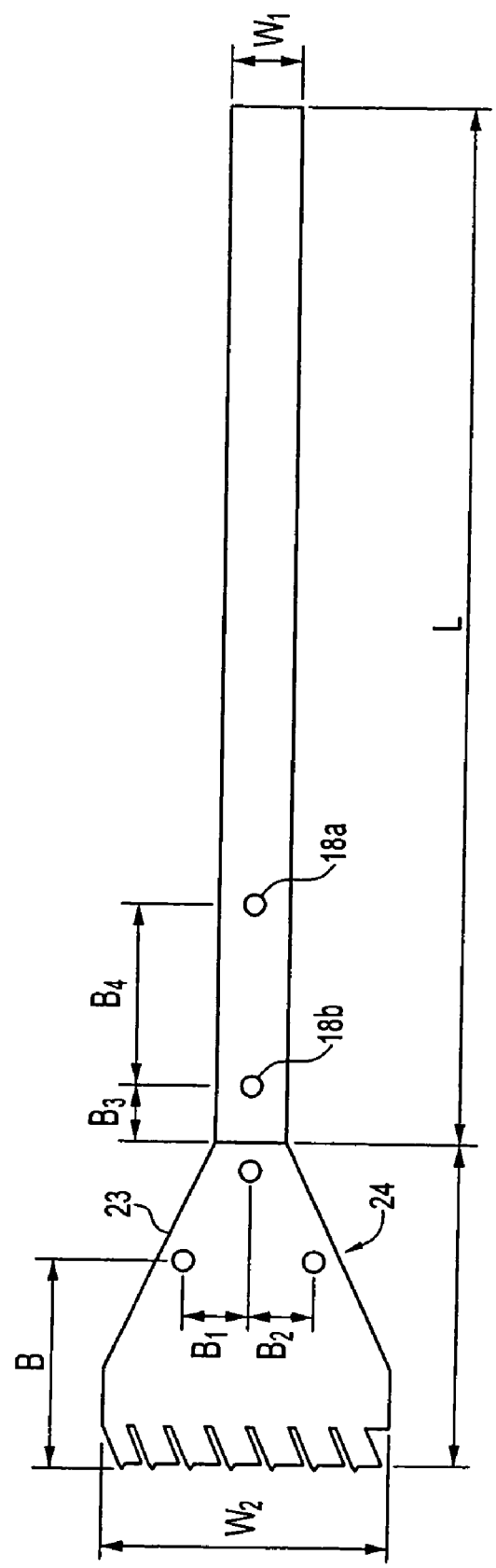
FIG. 4 is a top view of an embodiment of the present invention.

Claw 16 has a trunk 22 with at least two side portions 23 and 24, examples of which are shown in FIGS. 3 and 4. Side portions 23 and 24 widen outward from the scraper portion 14 and terminate with a plurality of spaced apart teeth 30, as can be seen in FIGS. 3 and 4. The width along the teeth $W_2$ and the width of the handle $W_1$ along the handle or at the opposite end of elongated body are in such proportion that $W_1$ is smaller than the teeth width $W_2$. Preferably, $W_1$ is at least half that of $W_2$. In an example, trunk width $W_1$ is about 3/8 inch to about 1 1/2 inches, preferably 1 1/4 inches, and $W_2$ is about 4 to about 8 inches, and preferably about 5 3/8 inches.

As shown in FIG. 5, each tooth 30 has a first edge 31 provided away from the trunk 22 creating a first angle 31a relative to the trunk's horizontal axis and a second complementary angle relative to the trunk's vertical axis (as indicated by the dotted line). A second edge 32 is provided inward from the first edge 31 and forms a projection 38 from the tooth. Projection 38 is designed to slide through the depths of grill grooves. Tooth dimensions adjust to accommodate the contours of anticipated grill grooves. A third edge 33 is provided from the second edge 32 extending generally along trunk's 22 horizontal axis, and a fourth edge 34 is provided inward from the third edge 33 to the trunk to create a third angle 33a relative to the trunk's or teeth's horizontal axis $W_2$.

Any number of teeth 30 can be used. FIG. 5 shows an example. The number of teeth 30 is selected and configured to the size of elongated body 11 chosen for the particular grilling application. Teeth 30 are generally of the same or substantially the same or similar in size and shape. A gap or tapering indent 35 is formed between each tooth 30 having an end wall 36 at or along the end of trunk 22. In an example, end wall 36 aligns generally parallel with $W_2$ or is curved. In an example, the curve has a radius of about 1/8 inch, which may vary by about 15%. The radius is adjustable to fit the contours of the surface of a grill grate. The series of indents or gaps 35 between the teeth 30 are generally all of the same, substantially similar, or similar in dimension.

In an example of an embodiment of the present invention as shown in FIG. 5, each tooth 30 ranges in length T from about 1/2 inch to about 1 1/2 inches, preferably 3/4 inch, from end wall 36 to third edge 33 where it adjoins second edge 32. In this example, each of projections 32 extends about another distance P of about 1/16 inch to about 1/4 inch therefrom, or preferably 1/8 inch. Also in this example, the distance from one projection to the next, $P_1$, is about 1/2 inch to 1 inch, preferably 0.775 inches. The distance from a second projection of $P_1$ to the next, $P_2$, ranges from about 1/4 to about 1 1/4 inches, preferably 0.775 inches. In a preferred embodiment, distances $P_1$ and $P_2$ are the same or substantially similar and the distance between each projection 38 is generally the same or similar. In another embodiment, the length T of each tooth 30 increases with each successive tooth, going from left to right from the perspective of a tool oriented as in FIG. 5.

As can be seen in FIG. 5, teeth 30 have inner width dimension $T_1$ and outer width dimension $T_2$. $T_1$ ranges from about 7/16 inch to about 11/16 inch, and $T_2$ ranges from about 5/16 inch to about 9/16 inch. Preferably, $T_1$ is about 9/16 inch and $T_2$ is about 7/16 inch. Teeth length T in an example ranges from about 1/2 inch to about 1 1/4 inch. Preferably, T is about 3/4 inch.

Also as depicted in FIG. 5, sides of projections 32 form a fourth angle 38a and a fifth angle 38b measured along the vertical axis of elongated body 11, angles 38a, measuring the left side of the projection's angle as shown in FIG. 5, and 38b, measuring the right side of the projection's angle as shown in FIG. 5, are preferably the same to provide a symmetric projection; however, they can differ as dictated by a grill groove. In an example, angle 38a measures about 21° to about 25°. Preferably it is about 23°. In another example, when measured from the horizontal axis along $W_2$, angles 31a and 33a of first edge 31 and fourth edge 34 range from about 64° to about 70°, and about 63° to about 67°, respectively. In an embodiment, angle 31a is about 67° and angle 33a is about 75°. Preferably, the magnitudes of the complementary second angle of 31a (shown in FIG. 5 as a complementary angle of 31a, as measured from the vertical axis which is represented by a dashed line) and the fourth angle 38a, also measured from the vertical axis, are substantially similar if not the same.

In an example as illustrated in FIG. 2 (not drawn to scale), elongated body 11 is about 20 to about 38 inches and is preferably about 26 inches in length. The claw 16 extending from handle portion is about 4 to about 8 inches, and preferably 6 inches. When the claw 16 is removably or fixedly attached to scraper portion 14, bolts 18a and 18b are used, as can be seen in the example of FIG. 4. In an example as shown, where four bolts are used the distances between each are $B_1$, $B_2$, $B_3$ and $B_4$. In an example, $B_1$ and $B_2$ are about 1 1/4 inches, $B_3$ is about 1 inch and $B_4$ is about 3 1/2 inches.

In use, the person using the grill cleaning claw of the present invention to scrape the grill will grab the device in the palm of his or her hand and apply a generally downward force against the broiler grate on the grill and slide it along the grooves of the grill to scrape the surfaces and push the grease and other materials through the small troughs in the grooves.

Accordingly, the primary objective of the present invention is to provide a grill scraper which can be inexpensively made and easily utilized as a scraping tool for use with cleaning the grooves of this particular style of grill. Another important objective of the present invention is to provide a grill scraper having a handle of sufficient length to help prevent or minimize splashing of grease or food onto the user of the present invention during scraping operation.

The aforementioned and further objects of the present invention will be explained in greater detail by reference to the attached figures and the following description of the preferred embodiment. As set forth herein, the present invention resides in the novel features of form, construction, mode of operation, and combination of parts presently described and embodied by the claims.

What is claimed is:

1. A grill cleaning apparatus comprising:
an elongated body having a handle portion at one end and a scraper portion at the opposite end, and a claw extending outwardly from said scraper portion, wherein said claw has a trunk with at least two side portions widening outward from said scraper portion and terminating with a plurality of teeth, each said tooth having a first edge provided away from said trunk creating a first angle relative to a horizontal axis of said trunk and a complementary second angle relative to a vertical axis of said trunk, a second edge provided inward from said first edge to form at least one projection, a third horizontal edge provided from said second edge extending along said horizontal axis of said trunk, and a fourth edge provided inward from said third edge to said trunk creating a third angle relative to said horizontal axis of said trunk, wherein an end wall connects an end of said fourth edge of a first tooth and an end of said first edge of a second tooth to create an indent.

2. The grill cleaning apparatus as set forth in claim 1 wherein said handle portion and is made of wood, ceramic, plastic, composite material or a combination thereof.

3. The grill cleaning apparatus as set forth in claim 1 wherein said handle portion is constructed to withstand the downward pressure applied by a user for scraping without buckling said handle portion.

4. The grill cleaning apparatus as set forth in claim 1 wherein said handle portion comprises an elongated cylindrical shape.

5. The grill cleaning apparatus as set forth in claim 1 wherein said claw comprises a rigid molded body fixedly or detachably connected to said scrapper portion.

6. The grill cleaning apparatus as set forth in claim 1 wherein said claw fixedly or detachably connects to said scrapper portion using a connecting means selected from the group consisting essentially of bolts, nails, screws, snaps, clamps, straps, adhesive, and combinations thereof.

7. The grill cleaning apparatus as set forth in claim 1 wherein said claw is made of a material selected from the group consisting essentially of metal, stainless steel, wood, plastic, and combinations thereof, wherein said claw material is adaptable, wherein said third horizontal edge is relatively sharp, and fit within the grooves of a broiler grate.

8. The grill cleaning apparatus as set forth in claim 1 wherein said first angle relative to said horizontal axis of said trunk is of less magnitude than said third angle relative to said horizontal axis of said trunk, wherein said magnitude is measured from a horizontal axis along the width of said plurality of teeth.

9. The grill cleaning apparatus as set forth in claim 1 wherein said indent is large enough to permit said teeth to fit into the grooves of a broiler grate.

10. The grill cleaning apparatus as set forth in claim 1 wherein each said projection fits into the depths of grooves of a broiler grate for scraping out unwanted particles, liquids or other material.

11. The grill cleaning apparatus as set forth in claim 1 wherein said claw has a width that is greater than the width of said handle portion.

12. The grill cleaning apparatus as set forth in claim 1 wherein said plurality of spaced apart teeth, includes number of teeth selected and configured according to size of said elongated body as determined by the grilling application of a user, wherein said teeth are of a similar, same, or substantially same size and shape, and wherein each said indent has substantially similar dimension.

13. The grill cleaning apparatus as set forth in claim 1 wherein each said projection has a substantially similar said second angle and said fourth angle, wherein said second angle and said fourth angle are based upon individual grill groove widths of said grooves of said broiler grate as determined by the grilling application of said user.

14. The grill cleaning apparatus as set forth in claim 1 wherein each of said projection has a substantially similar said fourth angle and said fifth angle.

15. The grill cleaning apparatus as set forth in claim 1 wherein each successive tooth length is of increasing length.

16. The grill cleaning apparatus as set forth in claim 1 wherein each of said successive tooth length is within the range of about ½ inch to about 1½ inches.

17. The grill cleaning apparatus as set forth in claim 1 wherein said first angle is within the range of about 20 to about 26 degrees, and wherein said third angle is within the range of about 13 to about 17 degrees.

18. The grill cleaning apparatus as set forth in claim 1 wherein said end wall is parallel or curved in shape.

19. The grill cleaning apparatus as set forth in claim 1 wherein each of said projection is within the range of about ⅙ inch to about 2 inches.

20. The grill cleaning apparatus as set forth in claim 1 wherein the width of said handle portion is within the range of about ⅜ inch to about 1½ inches, and wherein the width of each of said teeth is within the range of about 4 inches to about 8 inches; wherein said elongated body is within the range of about 20 inches to about 38 inches; and, wherein said claw is within the range of about 4 inches to about 8 inches.

* * * * *